May 8, 1956  M. F. JOHNS ET AL  2,744,560
APPARATUS FOR MANUFACTURING SLIDE FASTENER STRINGERS
Filed Dec. 15, 1949  10 Sheets-Sheet 1

*INVENTORS*
MAX F. JOHNS
LA MOINE E. JOHNS
BY *James X Franklin*
ATTORNEYS

INVENTORS
MAX F. JOHNS
LA MOINE E. JOHNS
BY James & Franklin
ATTORNEYS

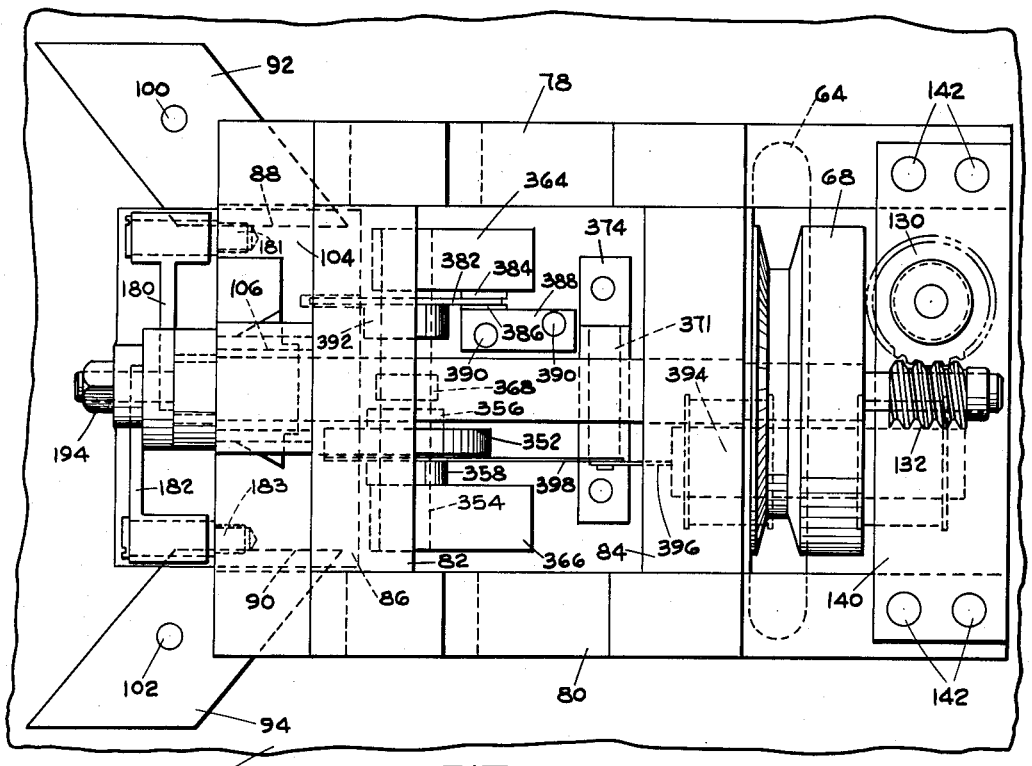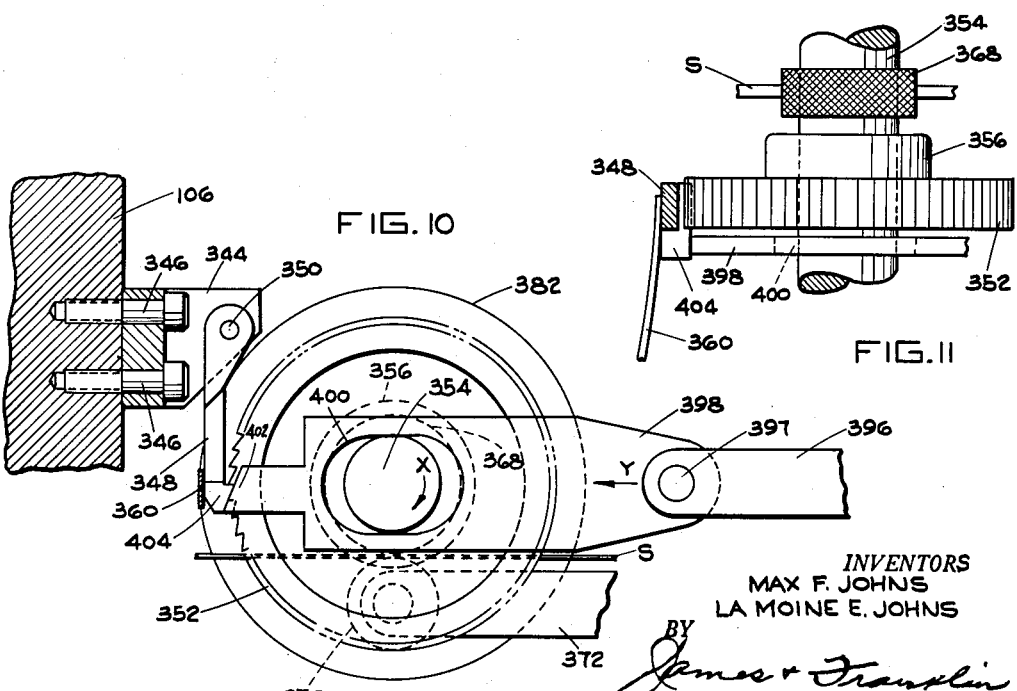

INVENTORS
MAX F. JOHNS
LA MOINE E. JOHNS
ATTORNEYS

May 8, 1956  M. F. JOHNS ET AL  2,744,560
APPARATUS FOR MANUFACTURING SLIDE FASTENER STRINGERS
Filed Dec. 15, 1949  10 Sheets-Sheet 6

INVENTORS
MAX F. JOHNS
LA MOINE E. JOHNS
BY
James & Mauflin
ATTORNEYS

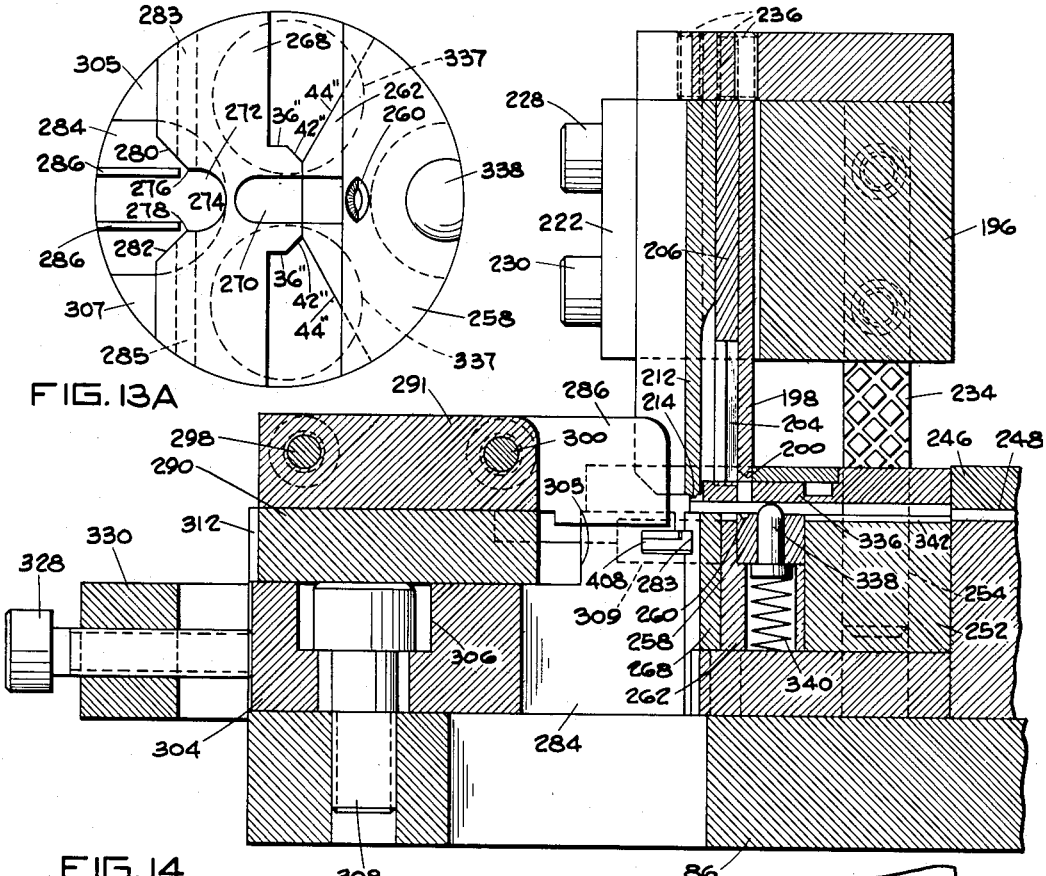
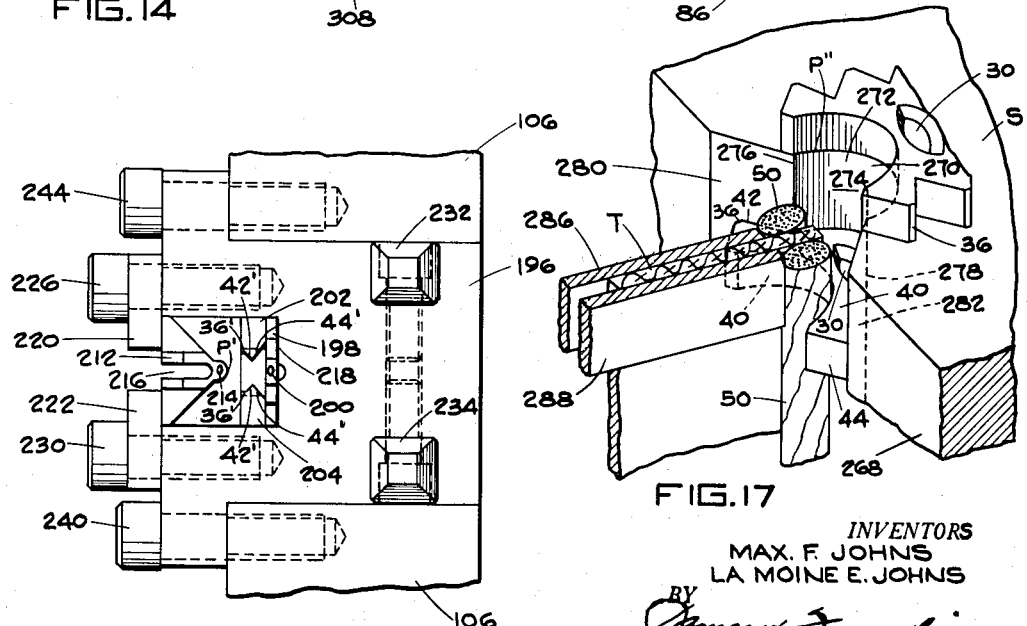

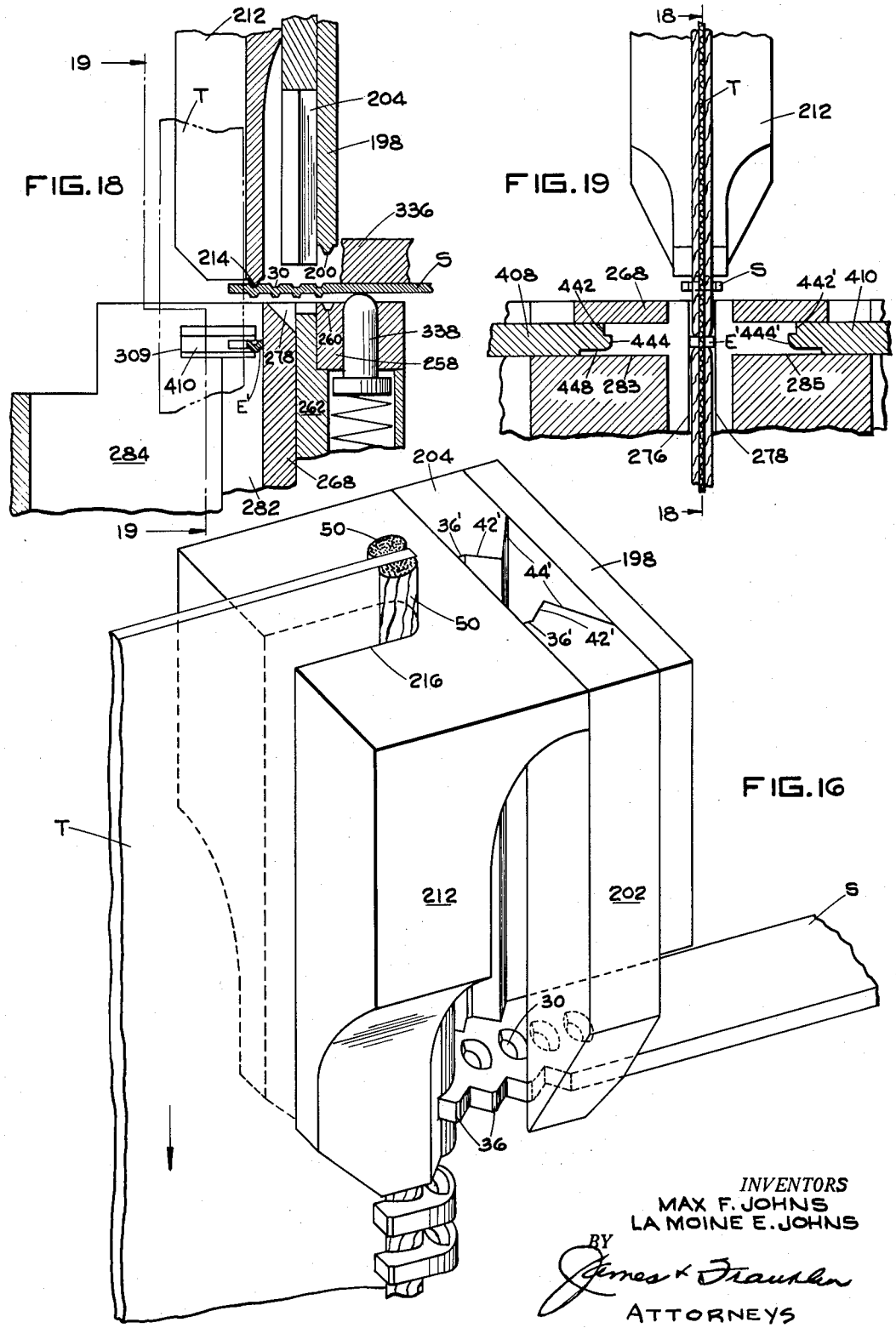

May 8, 1956 M. F. JOHNS ET AL 2,744,560
APPARATUS FOR MANUFACTURING SLIDE FASTENER STRINGERS
Filed Dec. 15, 1949 10 Sheets-Sheet 9

*INVENTORS*
MAX F. JOHNS
LA MOINE E. JOHNS
BY
ATTORNEYS

May 8, 1956  M. F. JOHNS ET AL  2,744,560
APPARATUS FOR MANUFACTURING SLIDE FASTENER STRINGERS
Filed Dec. 15, 1949  10 Sheets-Sheet 10
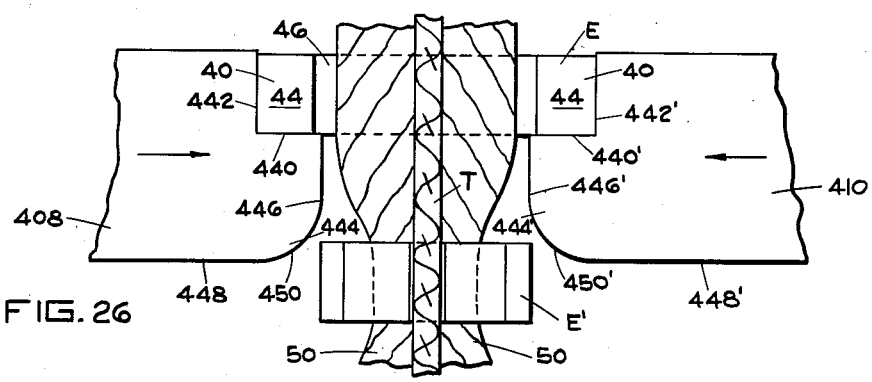
FIG. 26
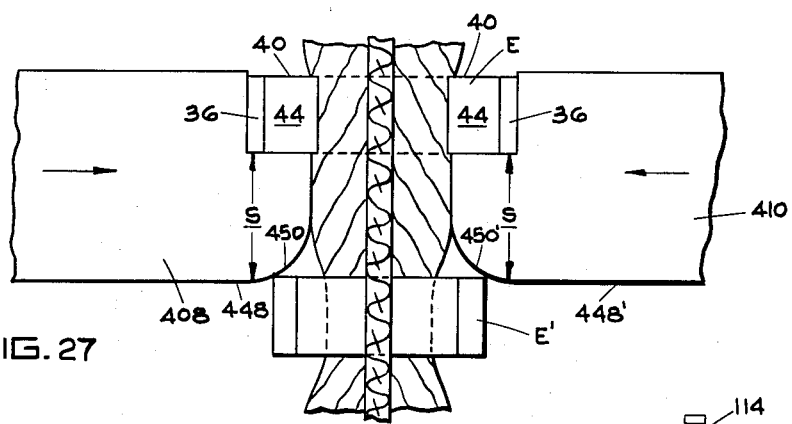
FIG. 27
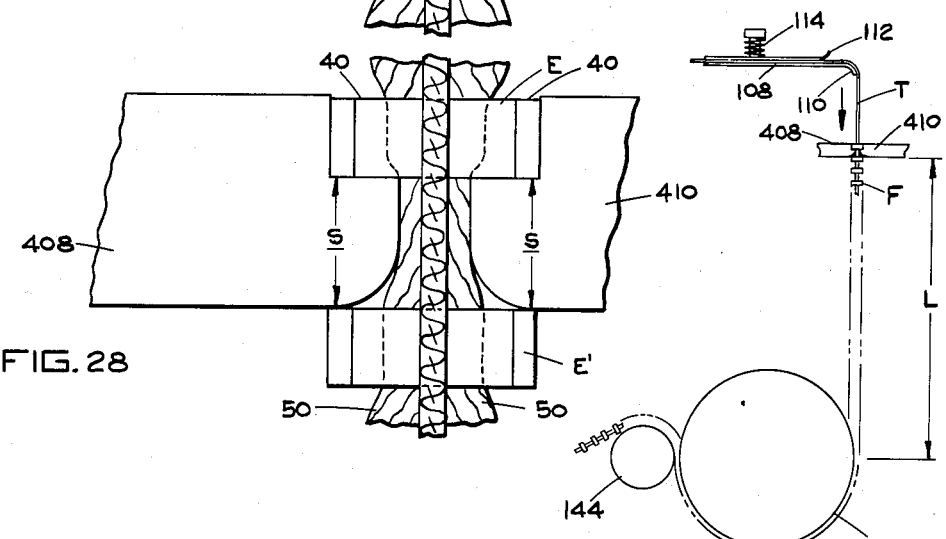
FIG. 28
FIG. 25
INVENTORS
MAX F. JOHNS
LA MOINE E. JOHNS
BY
James & Franklin
ATTORNEYS United States Patent Office 2,744,560
Patented May 8, 1956

2,744,560

APPARATUS FOR MANUFACTURING SLIDE FASTENER STRINGERS

Max F. Johns and La Moine E. Johns, Bloomfield, N. J., assignors to Conmar Products Corporation, Newark, N. J., a corporation of New Jersey Application December 15, 1949, Serial No. 133,110

13 Claims. (Cl. 153—1)

The invention relates to improvements in apparatus for manufacturing slide fastener stringers, and more particularly to apparatus for manufacturing stringers from continuous strip.

The commercial manufacture of slide fastener stringers at high speeds is accomplished by the so-called "strip process." A continuous wire or strip of fastener element material is fed toward the tape in a direction perpendicular to the tape, fastener elements are successively severed from the end of the strip and successively clamped onto the beaded edge of the tape in spaced relation.

One system for manufacturing slide fastener stringers in accordance with the "strip process" is the two-machine system. The wire or strip is preliminarily shaped in one machine, such as a rolling mill, to form a series of closely spaced, partially formed fastener elements in the strip. The formed strip is then fed into a second machine, jaws first, where fastener elements are severed from the end of the strip and attached to the tape. A system of this type is illustrated in the patents to Wintritz, 2,201,068, issued May 14, 1940 and Ulrich, 2,221,740, issued November 12, 1940.

A second system for manufacturing slide fastener stringers in accordance with the "strip process" may be termed the single-machine system. A continuous metal strip, perferably flat and otherwise undeformed, and a continuous tape are fed into one machine where all of the operations necessary to fabricate the slide fastener stringer are performed. The strip is shaped to form a series of closely spaced, partially formed fastener elements within the strip, the end of the strip is severed to form the fastener elements and the fastener elements are attached to the edge of the tape in the desired spaced relation.

Whether the single-machine or the two-machine system of "strip process" manufacture is used, there are three possible sequences in which the fastener elements or scoops may be severed from the end of the strip and attached to the tape. Firstly, the jaws of each fastener element may be clamped onto the tape before the fastener element is severed from the strip. Secondly, the jaws of each fastener element may be clamped onto the tape at the same time the fastener element is severed from the strip. Thirdly, each of the fastener elements may be completely severed from the strip prior to clamping the jaws of the fastener element onto the edge of the tape.

In the first instance, or where the jaws of each fastener element are clamped onto the tape before the fastener element is severed from the strip, the jaws frequently are cracked and hence the result is a weakened, if not totally unsatisfactory, fastener. This cracking is due to the confinement of the area of bending, in clamping, to a very short section of metal. If the bending of the jaws could be uniformly distributed over their entire lengths as they are being clamped onto the tape, cracking would not occur. However, because the jaws of the endmost element are being bent while such element is still a part of the strip, the bending of the metal is localized at the very small areas where each jaw is connected to the strip and thus the result is the undesirable cracking.

In the second instance, or where the jaws of each fastener element are clamped onto the tape simultaneously with the severance of the element from the strip, there is the difficult problem of properly timing and maintaining the proper timing of the severing punch with respect to the clamping blades at the very high speeds required for efficient, low-cost production of the product. As a practical matter, it is most difficult to sever and clamp simultaneously without forming undesirable fins or burrs along the sides of the fastener elements. Frequently, the metal is drawn or bent away from the cutting edge of the severing punch before the cutting edge has traveled a sufficient distance through the strip thickness to release the metal for unrestricted clamping of the jaws. The resulting fins or burrs require subsequent processing of the stringer which increases the cost of manufacturing the product. A rolling operation is necessary to flatten the fins or burrs on the stringer's fastener elements in order to obtain a commercially desirable smooth and easy-running slide fastener.

In the third instance, or where each fastener element is completely severed from the strip prior to clamping the element onto the tape, a satisfactory fastener is obtained which does not require subsequent processing and which, therefore, reduces the cost of manufacture. Cracked scoop legs or jaws are eliminated because the bending of the jaws in the clamping operation may be distributed over the entire sections of metal comprising the jaws; the jaws are not connected to the strip while they are being bent in the clamping operation. The undesirable burrs or fins are greatly minimized, or entirely eliminated, because the clamping operation is not accompanied by a drawing of the metal away from the punch incident to the effort to clamp and sever the fastener element simultaneously. However, completely severing the fastener elements from the end of the strip prior to clamping them onto the tape has hitherto presented a number of difficult problems.

In a superior slide fastener, each of the fastener elements is clamped onto the tape edge in a manner to provide maximum resistance to pulling it off the tape; also, the fastener elements are clamped onto the tape so that they are uniformly spaced with respect to each other. Maximum resistance to pull-off of the individual fastener elements is obtained when the jaws of each element completely and uniformly encircle the beaded edge of the tape. This requires positive and accurate positional control of each fastener element as it is being clamped onto the beaded tape edge. Uniform spacing or accurate pitch is obtained when the fastener elements are accurately fed to the repetitively operating clamping means. Uniforms spacing or pitch also requires that each fastener element be accurately positioned as it is being clamped.

Prior art means for realizing positive and highly accurate positional control of each fastener element clamped onto the tape and highly uniform pitch control have not been fully adequate where the fastener elements have been completely severed from the strip prior to clamping them onto the tape. The movement of the strip itself has been used to nest and feed fastener elements to the tape, such elements being severed several stations back of the clamping station. A severing die has been formed to locate a single loose element in the same plane as the strip from which it has been severed by the punch. It has been proposed to indent and at the same time sever a fastener element from the end of the strip and utilize the punch to deliver the severed fastener element to clamping means located below the plane in which the element has been severed from the strip. This proposal has not been successful. Another approach has been to interpose an intermediate transfer mechanism between the point of severance and the station where the elements are clamped onto the tape. The prerequisites of positive and accurate positional control of each element and accurate pitch control have not been simply and fully realized by any of these prior art means. Moreover, in the case of interposed transfer mechanisms, such mechanisms interfere with the high speed operation which the machine might otherwise achieve.

The present invention relates to improvements in the "strip process" manufacture of slide fasteners, and specifically to that mode of manufacture wherein the fastener elements are individually severed from the end of the strip to form completed elements prior to clamping such elements onto the tape. Either a single-machine or two-machine system of "strip process" manufacture is contemplated by our invention.

One object of our invention is to linearly feed a fastener element strip from the end of which fastener elements are successively and completely severed, to deliver the completely severed fastener elements to a clamping station, to positively and accurately control the movement of the severed fastener elements between the severing and clamping stations, and to positively and accurately control the positional location of each element as its jaws are clamped about the beaded edge of the tape.

Another object of the invention is to provide means for receiving, arresting and positionally locating the severed fastener elements at the clamping station, such means preferably being formed integrally with the clamping means.

A further object of the invention is to provide an ultra-high speed machine of the type hereinbefore referred to, wherein the severed elements are moved from the severing station to the attaching station by the punch itself, the punch having the same direction of movement as the direction of movement of the tape, the tape being preferably fed continuously.

Another object of the invention is to provide means for uniformly and accurately spacing the fastener elements being attached to a continuously moving tape, such means being preferably formed integral with the clamping means and providing additional positive means, aside from the timing of the machine, for obtaining a fastener having uniform and accurate element pitch.

Another object of the invention is to provide a simplified mechanism for feeding the strip of fastener element material.

Still another object of the invention is to attain high speeds of slide fastener stringer manufacture hitherto unrealized and limited only by the speed of the severing punch, rather than the speed of an intermediate transfer mechanism.

Still a further object of the invention is to provide a simple, sturdy single-machine for indenting or coining the strip to form the requisite projections and recesses, notching the edges of the strip to partially form the jaws of each of the fastener elements with a minimum of scrap, completely and successively severing fastener elements from the end of the strip and successively attaching the so severed elements to a continuously moving tape at speeds and with accuracies heretofore unattained in the manufacture of slide fastener stringers, such increased speeds and greater accuracy being achieved by virtue of the novel construction and operation of the machine.

To the accomplishment of the foregoing and more detailed objects which will hereinafter appear, our invention consists of improved apparatus for the manufacture of slide fastener stringers as hereinafter more particularly will be described in the following specification and sought to be defined in the claims. The specification is accompanied by drawings in which:

Fig. 9 is a plan view of the machine;

Fig. 10 is a side elevation, partly in section, of the means for feeding the strip fastener element material;

Fig. 11 is a plan view of the strip feeding means shown in Fig. 10;

Fig. 13A is a magnified view of the indenting, notching and fastener element severing dies shown in Fig. 13;

Fig. 14 is a vertical cross-section taken approximately along the plane of line 14—14 of Fig. 13, this figure, however, also including the assembly of punches, which is not shown in Fig. 13;

Fig. 15 is a bottom view of the punch assembly shown in Fig. 14;

Fig. 16 is a perspective view illustrating the manner in which the punch assembly progressively indents and notches the strip, and severs a fastener element from the end of the strip;

Fig. 17 is a perspective view, partly in section, showing the manner in which a fastener element which has been severed from the end of the strip is moved through the fastener element severing die as a fastener element is being delivered to the clamping means, the fastener element severing punch and the clamping means being omitted in this view for the sake of clarity in illustration;

Fig. 18 is a vertical cross-section taken approximately in the plane of line 18—18 of Fig. 19, the tape being indicated in phantom, illustrating the relationship of the punches, the dies and the clamping blades at one stage of the indenting, notching, severing and clamping operations, and showing the manner in which a severed element is delivered from the severing station to the clamping station;

Fig. 19 is a cross-section taken approximately along the plane of line 19—19 of Fig. 18;

Figure 24:
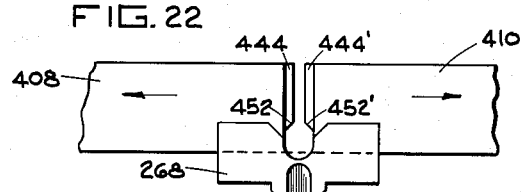

Figs. 20 and 21, and 22 and 23, are cross-sections corresponding to Figs. 18 and 19, respectively, illustrating second and third stages of the aforementioned operations and the manner in which a severed element is delivered to the clamping blades;

Fig. 24 is a plan view of the fastener element severing die and the ends of the clamping blades showing the relationship of these members when the clamping blades are at the ends of their strokes and have clamped a fastener element onto the tape, the tape, punch and fastener element being omitted in this view for the sake of clarity in illustration;

Fig. 25 is a schematic view of the tape feeding means in combination with means for clamping and spacing the fastener elements onto the tape; and Figs. 26, 27 and 28 are schematic views of three stages of fastener element clamping, wherein means are employed for positively controlling the pitch of fastener elements attached to the tape.

In accordance with the present invention, either a single-machine or two-machine system for the "strip process" mode of manufacture is contemplated to fabricate stringers from a continuous metal strip and a continuous tape in the sequence of fastener element severing and attaching operations which involves firstly, completely severing the fastener elements successively from the end of the continuous strip of fastener element material and secondly, clamping the completely severed elements onto the tape in the desired spaced relation. The preferred form of the invention relates to a single-machine system having the aforementioned severing and clamping sequence.

Considering the operations for fabricating the product in terms of the materials being fabricated into the finished stringers, namely, the continuous strip and the continuous tape, reference is made to Figs. 1 to 5 of the drawings. A flat strip S, preferably of a suitable metal, is indented to form the recesses 30 on the top side and medially of the strip and the corresponding projections 32 on the opposite or bottom side of the strip. The side edges of the strip S are notched or serrated, such notching operation resulting in the formation of very small pieces of scrap material, indicated by the shaded areas 34. The notching operation preferably is accomplished to form the flat surfaces 36 along the longitudinal edges of the strip for a purpose to be subsequently described. The end of the strip is then punched along the punch line P to form a completed fastener element E comprising a head portion 38 and a pair of widely spread jaws 40. The head portion 38 carries the aforesaid recess 30 on its upper side and the projection 32 on its lower side. It will be observed that the head portion 38 of each element E is located within and conforms to the jaws 40 of the next element, the head portion filling the space between the spread jaws. The jaws are so widely spaced and spread apart and so shaped on the interior as to form a space between them large enough to receive the head portion 38.

Figure 2:
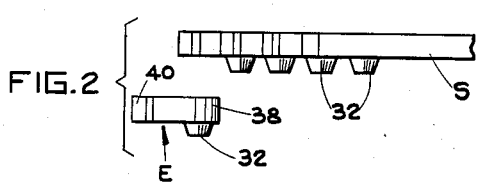
Fig. 2 is a side elevation of the portion of the strip shown in Fig. 1, the end thereof being severed to form a completed fastener element prior to attachment to the tape.
Figure 4:
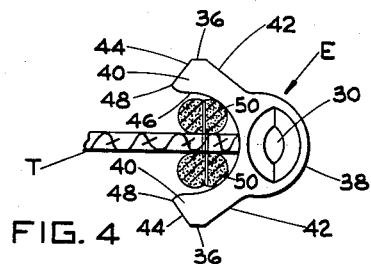
Fig. 4 illustrates the application of a fastener element to the tape prior to closing or clamping the jaws about the edge of the tape.

Fig. 2 shows an individual fastener element E severed from the end of the strip S. In Fig. 4 the element E is shown abutting the beaded edge of a tape T, and when the jaws 40 of the element are closed, it is clamped onto the tape, as shown in Fig. 5.

Figure 5:
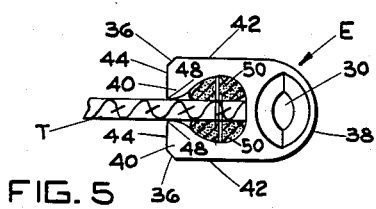
Fig. 5 is a view similar to Fig 4 but illustrating the jaws of the fastener element closed and clamped about the tape edge.

Comparing Figs. 4 and 5, it will be observed that the outer edges 42 of the jaws 40 change from a very divergent position to a parallel position, and furthermore, are spaced apart in an amount equal to the width of the head portion 38. The end walls 44 of the jaws 40 preferably are disposed substantially perpendicular to the outer edges 42 so that when the jaws are closed, the ends 44 form surfaces which are substantially perpendicular to the tape, as shown in Fig. 5. The small flat surfaces 36 which connect the surfaces 42 and 44 perform a valuable function in the manufacturing process, but nevertheless do not interfere with the operation of the finished fastener. The surfaces 36 enable the clamping means to have flat surface contact therewith, rather than pivotal contact as presented by sharp corners, and thus facilitates uniform bending of the jaws 40. The contour of the inside surface 46 of the jaws 40 is such that the beaded or raised edge of the tape is completely encircled when the jaws are closed with the ends 48 of the jaws bearing against the flat planar surfaces of the tape. The tape T may be made in accordance with any known method, such as, by sewing cords 50 on opposite sides at one edge of the tape, as shown, or by weaving the tape so that it is formed with a beaded or corded edge.

Figure 6:
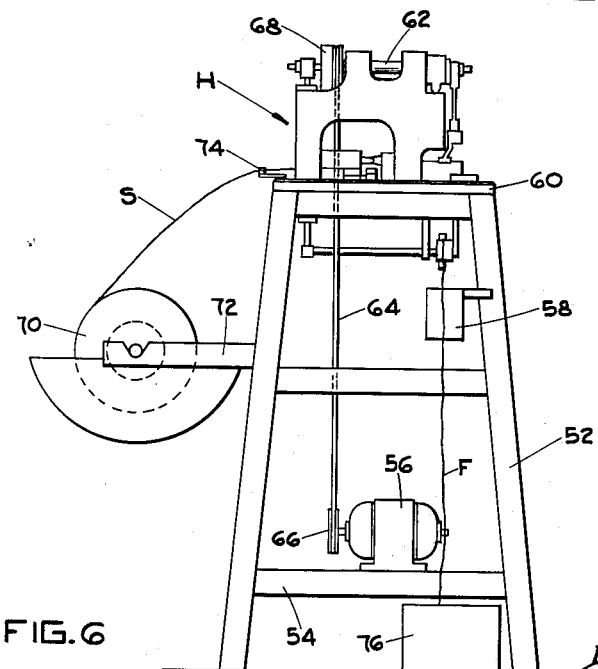
Fig. 6 is a side elevation of the preferred form of the apparatus of the present invention.

A single-machine for producing slide fastener stringers is shown generally in Fig. 6 and comprises a suitable frame pedestal 52, upon one cross-support 54 of which a motor 56 is mounted. The frame pedestal 52 has mounted thereon a switch box 58 for starting and stopping the motor 56 and the operation of the machine. The head of the machine, designated H, is mounted on a cross-support or bed plate 60 at the top of the pedestal 52.

Figure 8:
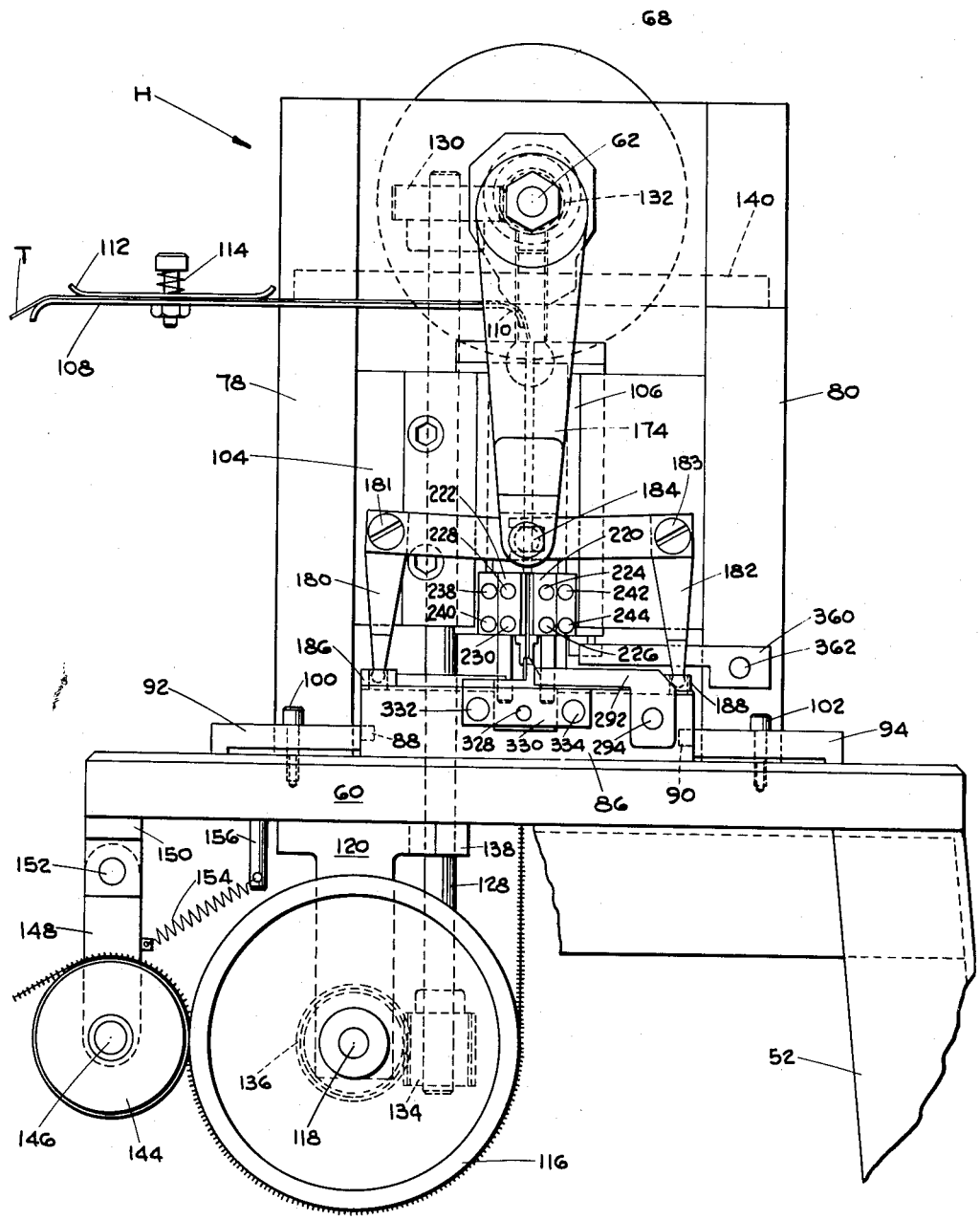
Fig. 8 is a front view of the head of the machine.

The means for feeding the strip S, the means for feeding the tape T, the means for indenting the strip to form the recesses and projections, the means for notching the strip, the means for severing the fastener elements from the strip, the means for delivering the severed elements from the severing station to the attaching station and the means for clamping the several elements to the tape are all actuated from a main shaft 62. The main shaft 62 is rotated by the motor 56 by means of a belt 64 between and around the pulley 66 off the motor 56 and a pulley 68 keyed to the main shaft 62. The strip stock S is taken from a reel 70 supported in spaced brackets 72 secured to the frame pedestal 52 and fed into the machine head H through a suitable guide 74. The tape T is fed into the machine and guided so that it will proceed in a vertical and downward direction, as shown in Fig. 8. The finished slide fastener stringer F comprising the fastener elements attached to the tape is deposited in a suitable container 76.

Figure 7:
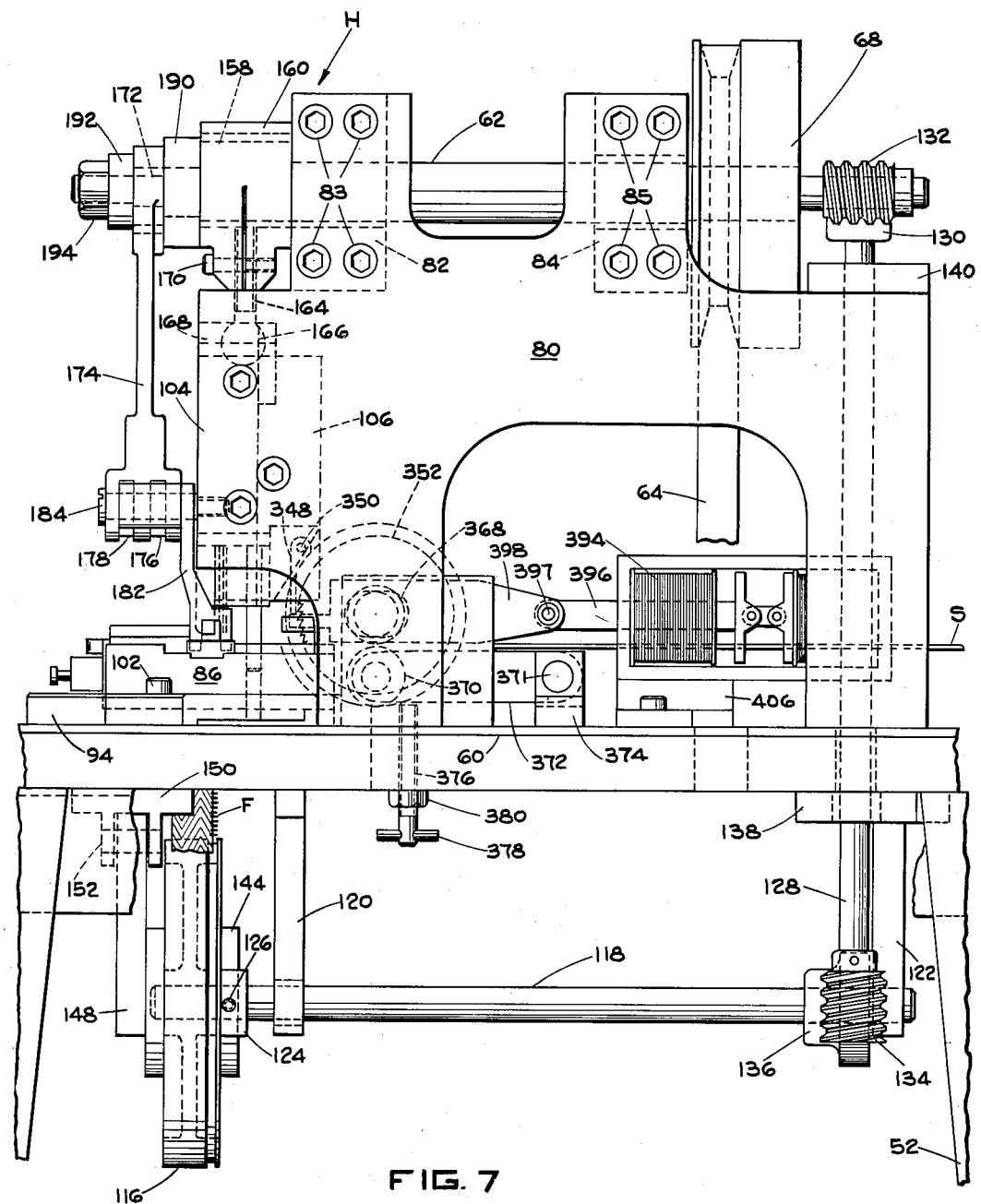
Fig. 7 is a side view of the head of the machine shown in Fig. 6.

Referring to Figs. 7, 8 and 9, the machine head H is mounted on the bed plate 60 and comprises the side frame plates 78 and 80, which, if desired, may be formed with the bed plate 60 as a single casting, and the cross bars 82 and 84, which are formed to also provide main bearing blocks for journalling the main shaft 62. The cross bars 82 and 84 are fastened to the side frame plates by the screws 83 and 85, respectively. A main die block 86 is removably located intermediate the side plates 78 and 80 and adjacent the bed plate 60. The die block 86 is provided with slots 88 and 90 along its sides which are adapted to receive the edge portions of die block clamps 92 and 94, respectively. The die block clamps 92 and 94 are pivotally mounted upon the bed plate 60 so that the clamps may be moved into or out of engagement with the slots 88 and 90. A pair of screws 100 and 102, which pass through the respective clamps 92 and 94 and fasten into the bed plate, permit the clamps to be pivoted about said screws and upon tightening serve to lock the main die block in position. By unscrewing the elements 100 and 102, the die clamps may be swung out of the slots 88 and 90, thus permitting the removal of the die block 86 when it is desired to regrind the dies. A stationary punch slide block 104 adapted to receive and guide a punch slide 106 is located above the die block 86.

As shown in Fig. 8, the tape T is fed into the machine over a horizontally disposed guide plate 108 which is formed at its forward end 110 with a descending curvature so that the tape T will pass through the machine head vertically and downwardly. Any suitable means may be used to apply the desired tension to the tape. As shown, a tension plate 112 overlies the guide plate 108 and is resiliently urged against it by the spring-loaded adjustable pin 114. The tape is pulled through the machine by a tape drum 116 which is located so that the stretch of tape between the end 110 of the tape guide and the periphery of the tape drum is in a straight line. The tape drum 116, which preferably has its surface knurled, is mounted on a shaft 118 which is journalled for rotation in the spaced bearing brackets 120 and 122. As shown in Fig. 7, the brackets 120 and 122 are secured to and suspended from the bed plate 60. The tape drum 116 is affixed to the shaft 118 by means of a collar 124 and a pin 126.

Figure 12:
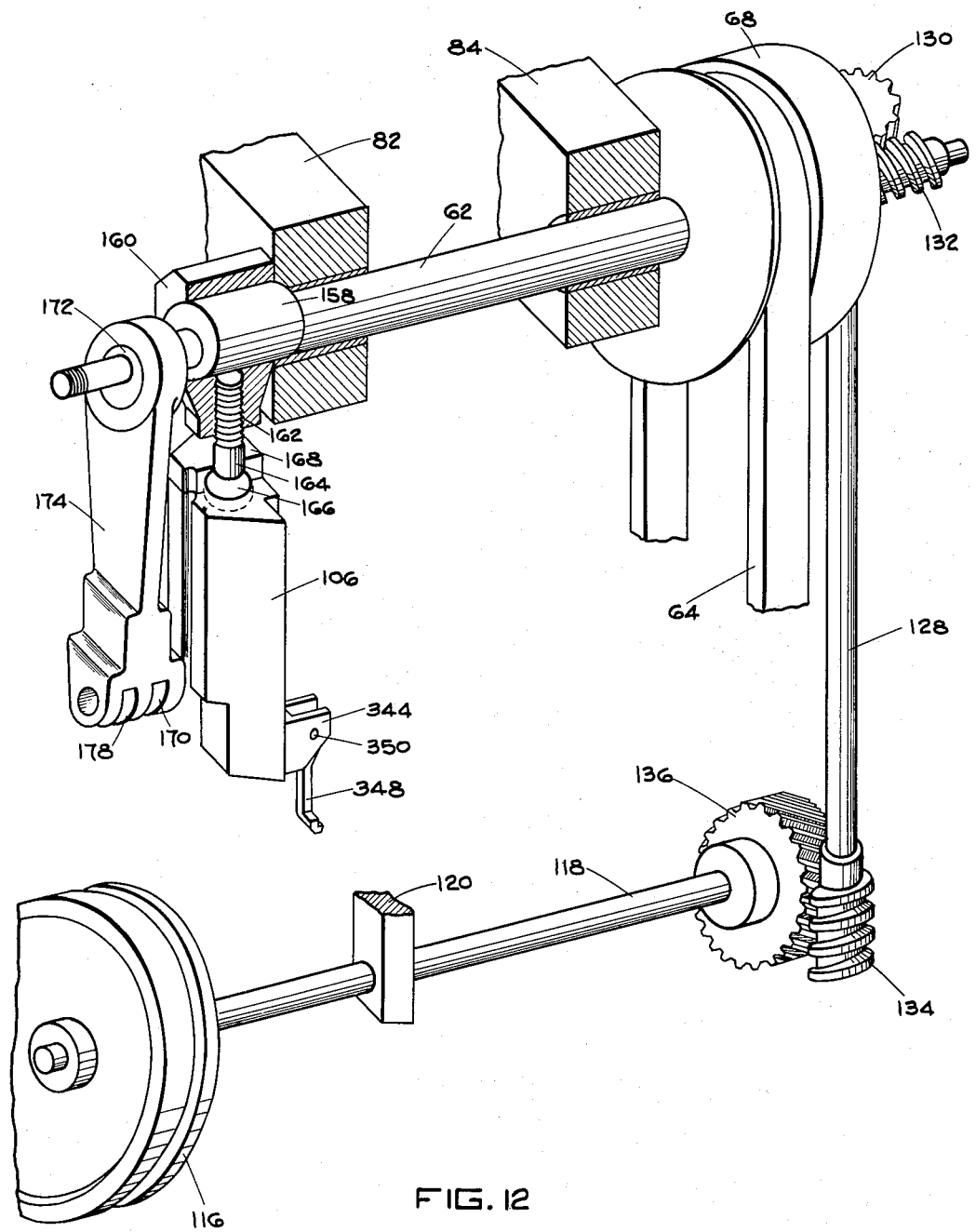
Fig. 12 is a perspective view of the drive mechanism for actuating the tape feeding means, the strip feeding means, the strip indenting punch, the notching punches, the fastener element severing punch and the fastener element jaw clamping blades.

As shown in Figs. 7 and 12, the tape drum 116 is rotated by the main shaft 62 through a vertical shaft 128 between the main shaft and the tape drum shaft 118. The vertical shaft 128 is provided with a worm gear 130 at its top end which engages a worm 132 on the end of the main shaft 62 and a worm 134 at its lower end engaging a worm gear 136 affixed to the tape drum shaft 118. As shown in Figs. 7, 8 and 9, the vertical shaft 128 passes through an opening in the bed plate 60 and is journalled near its lower end in a bearing bracket 138 secured to the bed plate 60 and is journalled near its upper end in a bearing plate 140. The bearing plate 140 is secured across the side frame plates 78 and 80 by suitable pins or screws 142, as shown in Fig. 9.

As shown in Figs. 7 and 8, the tape T is moved through the machine by the co-action with the positively driven tape drum 116 of an idler roll 144 pivotally mounted at 146 on an arm 148. The arm 148 is pivotally connected to a bifurcated bracket 150 by a pin 152, the bracket being attached to the bed plate 60. The idler roll 144 is resiliently urged against the tape drum 116 by means of a spring 154 attached at one end to the arm 148 and at its other end to a member 156 which is secured to the bed plate 60. The surface of the idler roll 144 is provided with a friction material, such as rubber, to facilitate gripping of the tape T and the movement thereof at the bight between the tape drum and the idler roll.

Rather than describe at this point the means for feeding the other component through the machine, the strip S, such indexing means will subsequently be described in detail. The feeding of the strip S is simply accomplished by the movement of the punch slide 106, which imparts movement to the indenting, notching and fastener element severing punches; therefore, the description of the strip feeding means will be more clearly understood after a description of the means for indenting, notching and fastener element severing.

As best shown in Fig. 12, the main shaft 62 has formed as a part thereof an eccentric 158 for actuating the punch slide 106. The punch slide, to which a holder is secured for carrying the indenting, notching and severing punches, and which will subsequently be described in detail, is given a harmonic reciprocating motion by a ball screw type of connection between a pitman 160 and the punch slide. The pitman 160 is screw threaded at 162 to adjustably receive the threaded ball link 164, the ball portion 166 of the link being secured to the punch assembly slide 106 by means of the ball joint cap 168. This arrangement permits adjustment of the length of the punches' strokes. To permit adjustment of the pitman connection about the eccentric 158 a pitman screw 170, shown in Fig. 7, is provided.

The mechanism for closing the jaws of the fastener elements about the tape is actuated from the main shaft 62 by means of an eccentric 172 mounted on the shaft for rotational adjustment. As shown in Fig. 12, the eccentric's arm 174 is formed at its lower end with the slots 176 and 178. The slots each receive an arm of a pair of bell crank levers 180 and 182, shown in Fig. 8, which are connected to the eccentric arm by means of a pin 184. The pin passes through the slots and apertures in one arm of each of the bell crank levers. The other end of the arm of the bell crank lever 180 is connected to a clamping blade holder 186 and the bell crank 182 is likewise connected to a clamping blade holder 188. The bell cranks 180 and 182 are pivotally connected to the punch slide block 104 by pins 181 and 183, respectively, as shown in Figs. 8 and 9. The clamping blades and their action upon the severed elements will subsequently be described.

Upon each revolution of the main shaft 62, the punch slide 106 reciprocates in a vertical direction and the clamping blade holders 186 and 188 reciprocate in a horizontal direction and pass through one cycle of operation. After having adjusted the throw of the punch slide by adjusting the ball link pitman connection, the timing between the indenting, notching and severing operations performed by the punches, which are actuated by the movement of the punch slide 106, and the clamping operation performed by a pair of clamping blades, which are moved by the clamping blade holders 186 and 188, may be selectively varied with respect to each other by adjusting the relative position of the adjustable clamping eccentric 172 with respect to the eccentric 158. As shown in Fig. 7, a pair of washers 190 and 192 on the main shaft 62 and the screw threading on the end of the shaft, which receives a lock nut 194, permits locking the eccentrics 158 and 172 in the desired relative positions.

Figure 1:
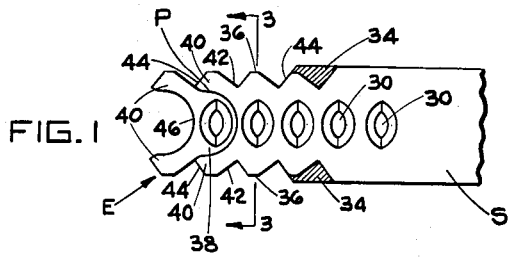
Fig. 1 is a plan view of a piece of fastener element strip material having the end thereof formed and severed in accordance with the present invention.
Figure 3:
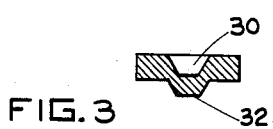
Fig. 3 is a cross-section taken approximately in the plane of line 3—3 of Fig. 1.

As shown in Figs. 14 and 15, the indenting, notching and fastener element severing operations are accomplished by means of a group of punches fixedly secured and predeterminedly spaced and arranged with respect to each other in a punch holder 196. The punch holder 196 carries an indenting punch 198 provided with a projection 200 to form the recesses 30 on the top side and the corresponding projections 32 on the opposite side of the strip S, as illustrated in Figs. 1, 2 and 3. The projection 200 preferably is contoured so that it is non-circular in horizontal cross-section, preferably being elliptical in this planar cross-section.

A pair of laterally spaced notching punches 202 and 204 are located immediately adjacent the indenting punch 198 with a spacer 206 therebetween to rigidify the assembly. The notching punches have their cutting edges shaped to form the strip with serrations having the contour shown in Fig. 1. These punches are provided with the parallel cutting edges 36', the diverging cutting edges 42' and the converging cutting edges 44' corresponding to the fastener element surfaces or edges 36, 42 and 44, respectively, shown in Figs. 1, 4 and 5.

A fastener element severing punch 212 is located adjacent the two notching punches 202 and 204. The punch is provided with a pilot projection 214, preferably having the same contour as the projection 200 of the indenting punch. The punch also is provided with a tape slot 216 to permit the passage of the tape T therethrough. The cutting edge of the punch 212 possesses a contour P' corresponding to the contour of the punch line P indicated in Fig. 1.

The indenting punch, the notching punches and the fastener element severing punch are all received and assembled within a substantially rectangular slot 218 within the punch holder 196. The assembly of punches is maintained in the slot 218 by means of a pair of gibs 220 and 222 the edges of which extend across the slot 218 and bear against the severing punch 212. The gib 220 is fastened to the punch holder 196 by means of a pair of screws 224 and 226 and the gib 222 is likewise fastened to the punch holder by means of a pair of screws 228 and 230. The gib retaining screws, all shown in Fig. 8, are threadedly received within the punch holder 196 and pass through apertures formed in the gibs. The entire assembly of punches may be removed for regrinding when necessary, by simply removing the gib screws, whereby the punches may easily be removed from the punch holder. The punch holder is provided with a pair of spaced leader pins 232 and 234 suitably fastened within the holder to guide the movement of the punch holder with respect to the die block 86.

As hereinbefore stated, the indenting, notching and severing punches are fixedly secured and predeterminedly located and arranged with respect to each other within the punch holder 196. This includes selectively fixing the operating faces of the punches with respect to each other in a vertical plane. As shown in Fig. 14, the operating faces of the indenting, notching and fastener element severing punches are made vertically adjustable with respect to each other by means of a plurality of screw threaded pins 236 received in the top of the punch holder 196. Each punch has an adjusting pin 236 bearing against its upper end so that the position of the operating face of each punch may be adjusted to a predetermined height or position. By vertically adjusting and fixing the punches in the holder so that the operating face of the fastener element severing punch 212 is lower than the face of the indenting punch 198, the fastener element severing punch has a longer working stroke than the indenting punch. Preferably, but not necessarily, the fastener element severing punch is also adjusted to have a longer working stroke than the notching punches 202 and 204. The notching punches 202 and 204 are adjusted to have longer working strokes than the indenting punch 198. Thus, while all the punches are fixed with respect to each other so that upon each revolution of the main shaft 62, the strip S is indented, notched and severed progressively, the operating face of the fastener element severing punch will, at the end of its working stroke, be beyond and below the plane of the strip S, or the plane in which the strip is indented and a fastener element is severed from the strip. The punch holder 196 with its assembly of described punches is secured to the punch slide 106 for reciprocation therewith by means of four screws 238, 240, 242 and 244, all of which are shown in Fig. 8.

Figure 13:
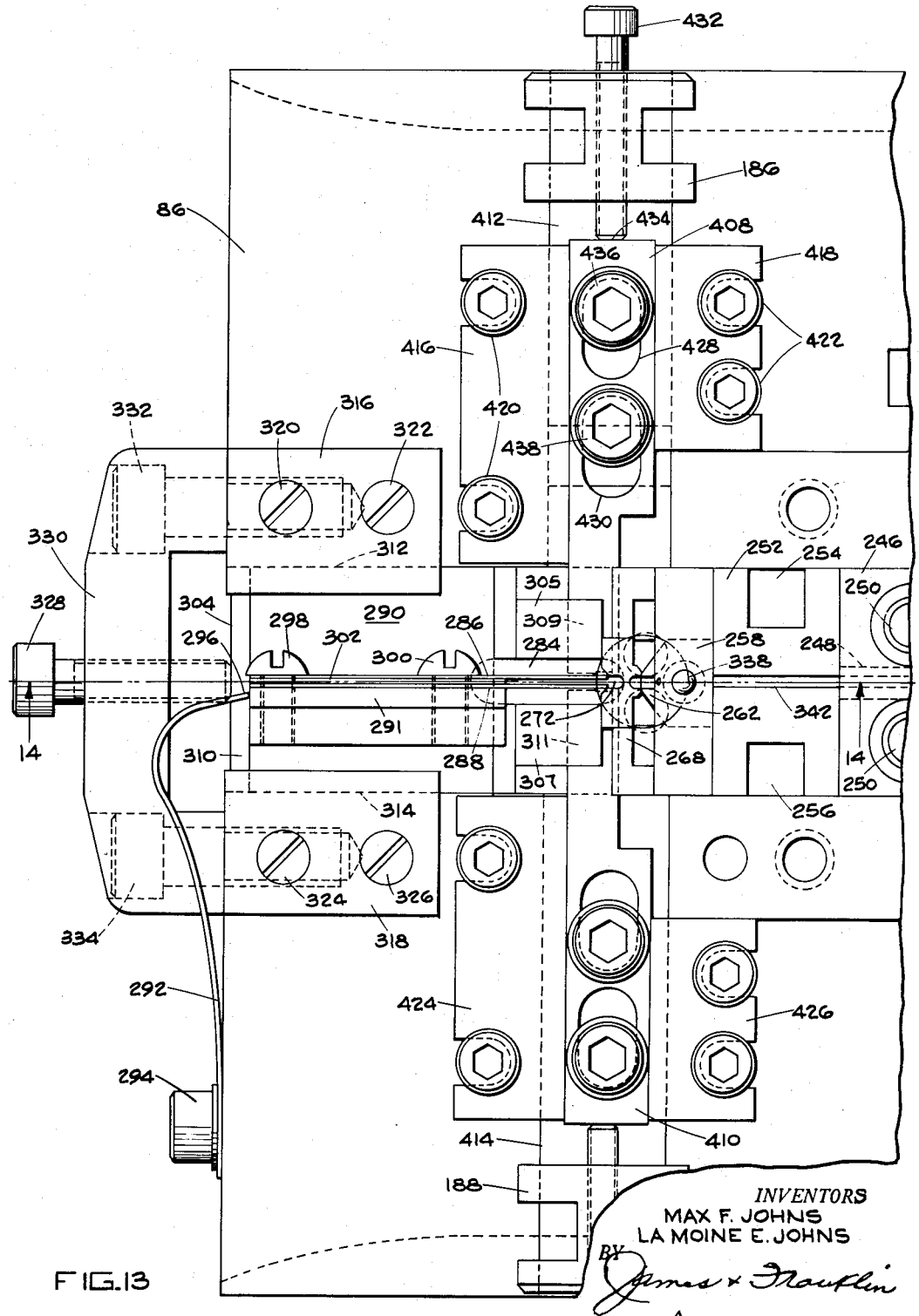
Fig. 13 is a partial plan view of the die assembly for indenting, notching and fastener element severing, this view also showing the means for clamping the severed fastener elements onto the tape and the means for guiding the tape in its passage through the die.

The dies which cooperate with the punches hereinbefore described are shown in Figs. 13, 13A and 14. The main die block 86 is provided at its rear portion with a block 246 having an aperture 248 for guiding the strip S therethrough. The rear block 246 is fastened to the main die block 86 by means of a pair of screws 250. A leader pin block 252, having a horizontal aperture to allow the strip S therethrough, and having a pair of vertically disposed leader pin apertures 254 and 256 for receiving the leader pins 232 and 234 of the punch holder 196, is disposed on the main die block and adjacent the rear block 246. An indenting die 258 having a recess 260 is provided to receive the metal displaced from the strip S by the projection 200 on the indenting punch 198. The projection 200 on the punch 198 and the recess 260 in the indenting die 258 cooperate to form the recesses 30 on the top side of the strip S and the corresponding projections 32 on its lower face.

The notching die preferably is made in two parts and includes a notching die insert 262 having the converging shearing edges 44" for forming the jaw end surfaces 44 of the fastener element. The remaining shearing edges of the notching die are formed as a part of a fastener element severing die 268, such shearing edges being indicated at 42" for forming the fastener element edges 42, and at 36" for forming the flats 36. A groove 270 is provided on top of the notching die insert 262 and on top of the rear portion of the fastener element severing die insert 268 to provide the necessary clearance for the projections 32 as the indented strip is moved over the dies.

As shown in Figs. 13A and 17, the severing die 268 is provided with a contoured cutting edge P" opening onto a slot or aperture 272, which extends vertically through the die and has a contoured wall 274 of the same shape as the cutting edge P". The wall 274 is contoured throughout its length to conform with the shape of the head portion 38 of a fastener element. The contoured wall 274 terminates, at 276 and 278, in the diverging walls 280 and 282 which are set at the same angle as the shearing edges 42" of the notching die. The severing die 268 is located so that its slot 272 opens onto a tape slot 284 which extends vertically through the main die block 86. As indicated in Figs. 13A and 14, the severing die is provided below its cutting edge with horizontal, laterally extending slots 283 and 285 to permit the passage of the clamping blades.

To guide the tape T through the severing die 268 and urge the beaded edge of the tape within the slot 272, a tape guide is provided. As shown in Figs. 13, 13A, 14 and 17, the tape guide comprises a pair of spaced, vertically disposed plates 286 and 288 which extend over the tape slot 284 of the die block and into the tape slot 272 of the severing die 268. The tape guide plates 286 and 288 are mounted on a tape guide plate holder 290 which is resiliently urged toward the severing die 268 by means of a leaf spring 292 pivotally mounted on the main die block at 294. The tape guide plate holder comprises a thin block having a right-angled extension 291. The spring 292 is curved so that its end 296 bears against the forward end of the guide plate holder 290 thereby resiliently urging the tape guide plates 286 and 288, which extend beyond the holder portion 291, into the severing die's slot 272, where the forward edges of the blades press against the cords 50 on the tape T, as shown in Fig. 17. The guide plates 286 and 288 are secured to the extension 291 of the holder 290 by means of the screws 298 and 300 which pass through apertures in the plates and are threadedly received within the extension 291. A suitable spacer 302, selected of a thickness suitable for the given thickness of the tape being processed, is inserted between the guide plates 286 and 288 to maintain the proper spacing between the plates.

As shown in Figs. 13 and 14, the tape guide plate holder 200 is mounted upon a front block 304. The front block has a slot 306 so that the front block may be locked to the main die block 86 by means of a screw 308 threadedly received within the main die block. The front die block is provided at one end, which is adjacent the severing die 268, with a pair of spaced bosses 305 and 307, one on each side of the tape slot 284. The bosses 305 and 307 are provided with horizontal, laterally extending slots 309 and 311, respectively, which are aligned with the slots 283 and 285 in the die 268, respectively, to permit the passage of the clamping blades. The front die block 304 is slidably mounted in a groove 310 in the main die block, said groove being formed by vertical sides 312 and 314 formed within the main die block. A pair of gibs 316 and 318 maintain the tape guide plate holder 290 in the groove 310 by means of gib screws 320, 322 for the gib 316, and 324, 326 for the gib 318. The gib plate screws are threadedly received in the main die block 86 and pass through apertures in their respective gib plates.

The front die block 304 maintains the indenting, notching and severing dies in their proper positions by pressing them against the backing provided by the leader pin block 252 which, in turn, is backed up by the rear block 226. Means is provided to permit position adjustment of the assembly of the dies and for this purpose an adjusting screw 328 is provided, the end of which bears against the front block 304. The adjusting screw 328 is threaded through a bracket 330 which is secured to the main die block 86 by means of the screws 332 and 334. After adjusting the position of the front block on the main die block by means of the adjusting screw 328, the two blocks are locked together by tightening the lock screw 308. To remove the aforementioned dies for regrinding when necessary, the tape guide plate holder 290 is first removed by swinging the spring 292 about its pivot 294 out of contact with the tape guide plate holder. The tape guide plate holder is removed by sliding it out from under the gibs 316 and 318 or the gibs may be removed. After releasing the lock screw 308 and the adjusting screw 328, the front block 304 which holds the assembled dies releases the assembly of die inserts.

It will be apparent from the above description that the punches and dies are arranged to provide a so-called progressive die. Upon each revolution of the main shaft, the indenting, notching and severing punches and dies cooperate to progressively indent, notch and sever the strip S, the severing operation serving to complete the fastener element preparatory to clamping it onto the tape. Since projections are formed on the lower face of the strip, it is necessary to lift the strip S away from the dies after each stroke of the punches. Also, it is necessary to separate the scrap material away from the main body of the strip or vice versa and remove the scrap pieces. For these purposes, a stripper plate 336, shown in Fig.

14, having suitable apertures to permit passage of the punches therethrough, is provided to overlie the indenting, notching and severing dies. The pieces of scrap material, 34, formed in the notching operation are removed by a suitable suction or compressed air system, only the channels 337 of which are indicated in Fig. 13A. To return the strip S to the requisite working level after the series of operations have been performed upon it, a spring-loaded pin 338 is provided to pass through the indenting die 258, being located in front of the recess 260. As shown in Fig. 14, a spring 340 urges the pin 338 upwardly against the bottom face of the strip S so that after each downward movement of the assembly of punches, the strip is returned to a level where the projections formed by the indenting punch will clear the dies in the forward travel of the strip. To permit the strip S to be removed from the machine preparatory to threading a new reel of strip material into the machine when a reel is exhausted, a groove 342 is provided in the top of the leader pin block 252 and the rear block 246. Thus, the previously formed projections 32 may ride in the groove 342 and thereby allow the end of the exhausted reel of strip material to be backed out or pulled to the right and out of the die, as shown in Fig. 13.

The means for feeding the strip S across the dies and beneath the indenting, notching and fastener element severing punches is illustrated in Figs. 7 through 12. A bifurcated bracket 344 is secured to the punch slide 106 by means of screws 346 threadedly received within the punch slide. A pawl 348 is pivotally mounted within the bracket 344 by a pin 350. The pawl 348 thus is reciprocated by the reciprocating motion imparted to the punch slide 106 by the pitman connection between the punch slide eccentric 158 and the punch slide. The pawl 348 cooperates with the teeth of a ratchet wheel 352 which is fixedly mounted on a shaft 354, the shaft rotating in the direction X, as shown in Fig. 10. The ratchet wheel 352 is fixed to the shaft 354 by a pair of collars 356 and 358, as shown in Fig. 9. The pawl 348 is resiliently urged into engagement with the teeth of the ratchet wheel 352 by a leaf spring 360, one end of which bears against the lower end of the pawl, the other end of which is fastened to the side frame plate 80 by suitable fastening means 362, as shown in Fig. 8.

As shown in Fig. 9, the strip feed shaft 354 is journalled in a pair of spaced bearing blocks 364 and 366 fastened to the bed plate 60. A feed roll 368 is fixed to the shaft 354 to rotate therewith. The surface of the feed roll is knurled to grip the strip S. A second feed roll 370 is rotatably mounted at one end of an arm 372 (see Fig. 7), the other end being pivotally supported in a bracket 374 fixed to the bed plate 60. The pressure upon the strip S, between the rolls 368 and 370 may be adjusted by a threaded pin 376, one end of which bears against the arm 372, the other terminating in a handle 378. The adjusting pin 376 is threaded through the bed plate 60. After adjusting the pressure upon the strip S, such adjustment may be maintained by a lock nut 380 threaded on the pin 376 and which cooperates with the bottom surface of the bed plate.

As shown in Fig. 9, overtravel of the positively driven feed roll 368 is prevented by a brake disk 382 mounted for rotation with the shaft 354. The brake disk co-acts with a pair of brake shoes 384 and 386 of suitable friction material, such as leather, which bear against each side of the disk. The brake shoe 384 may be mounted upon the bearing block 364, whereas the brake shoe 386 may be attached to an additional block 388 which is fastened to the bed plate 60 by means of screws 390. The brake disk 382 is secured by a suitable collar 392 to rotate with the shaft 354.

It will be apparent that the strip S is indexed by the intermittent rotation imparted to the feed roll 368 by the pawl and ratchet wheel mechanism, which is actuated by the movement of the punch slide 106. Thus, the feed roll is indexed very simply by means connected to the punches and is directly responsive to the movement of the punches. The motion imparted to the punches serves to progressively feed the strip S across the arranged dies where the requisite indenting, notching and severing operations are performed on the strip.

Simple means is provided for gap spacing or omitting fastener elements on the tape between stringer lengths. This is, preferably, accomplished by halting the movement of the strip S. As shown in Figs. 7, 9, 10 and 11, the machine is provided with a solenoid 394 having a core 396 which is moved outwardly when the solenoid is energized and thereby outwardly moves a ratchet skid 398 in the direction designated Y in Fig. 10. The ratchet skid is connected to the core by a pin 397. The ratchet skid is provided with a slot 400 which permits the skid to be received over the shaft 354 and moved horizontally with respect thereto. The ratchet skid 398 is provided with a nose 402, which when the skid moves in the direction Y will engage an extension 404 at the lower end of the pawl 348. This causes the pawl to ride free of the teeth on the ratchet wheel 352 and therefore stops the rotation of the shaft 354, stops the rotation of the feed roll 368 and halts the feeding of the strip S. This interrupts the delivery of fastener elements to the tape and produces the desired gap or spacing between fastener elements. After a desired interval, the solenoid is de-energized whereupon the feed of the strip S is resumed, the spring 360 returning the pawl 348 for operative engagement with the ratchet teeth on the wheel 352. The time and length of strip feed interruptions may be determined by a suitable counter (not shown) which is provided with a suitable contact mechanism controlling the electrical circuit of the solenoid 394. The solenoid is disposed within a suitable casing and mounted upon a plate 406 which is secured to the bed plate 60.

As shown in Fig. 13, the individually severed fastener elements are attached to the tape by a pair of oppositely disposed clamping blades 408 and 410, the blade 408 being adjustably secured to the clamping blade holder 186 and the blade 410 being likewise adjustably secured to the clamping blade holder 188. The clamping blade holders 186 and 188 are arranged to slide in transversely extending, oppositely disposed ways 412 and 414 formed as grooves within the main die block 86. The clamping blade holder 186 is maintained in the guideway 412 by a pair of gibs 416 and 418 on opposite sides of the guideway. The gibs have their longitudinal edges extending over the guideway 412 and are removably secured to the main die block 86 by means of the gib screws 420 and 422, respectively. The clamping blade holder 188 is likewise maintained in its guideway by a pair of gibs 424 and 426.

The clamping blade 408 is provided with a pair of slots 428 and 430 to permit relative adjustment of the blade in a longitudinal direction with respect to its holder and thereby permit adjustment of the blade's working stroke. An adjusting pin 432 extends through the end of the clamping blade holder 186 so that its face 434 may bear against the end of the clamping blade 408 resting upon the blade holder 186. Upon adjusting the pin 432 and the position of the clamping plate 408 to the desired position on the blade holder 186, a pair of screws 436 and 438, backed up by washers and having their shanks extending through the slots 428 and 430, are tightened to fix the position of the clamping blade. The shanks of the screws 436 and 438 are threadedly received in the clamping blade holder 186. The clamping blade 410 is made adjustable with respect to its holder 188 in the same manner, therefore, a repetitive description is unnecessary.

The clamping blades 408 and 410 are formed so that their working ends will reciprocate through the slots 309 and 311 of the front block 304 and the slots 283 and 285 of the severing die 268. Thus, the plane of movement of the clamping blades is below the cutting edge of the severing die 268, or below the plane in which the fastener elements are severed from the strip. Also, the clamping blades reciprocate in a direction which is transverse with respect to the direction of the tape movement through the severing die. The working faces of the blades 408 and 410 possess the same configuration and hence the description of the blade 408 will suffice for the description of the blade 410, similar parts on the blade 410 being primed when reference to such similar parts is necessary.

In the preferred embodiment, the clamping blades are integrally formed so that they will perform three separate and distinct functions. The blades are shaped or contoured to clamp the individual fastener elements onto the tape. Secondly, they are formed to provide aligned supports for receiving, arresting and positionally locating the fastener elements as they are individually and successively delivered by the fastener element severing punch to the clamping station. Thirdly, the blades are formed to provide means for positively and accurately spacing the fastener elements as they are clamped to the tape. Instead of integrally forming the blades to perform the aforesaid three functions, it is within the scope of the invention to provide individual means for performing each or two of said functions.

As shown in Figs. 18 through 24, and more specifically in Figs. 26 to 28, the working end of the blade 408 is provided with the horizontal step 440 and a vertical riser 442 to form a ledge 444. The leading surface of the ledge 444, which extends in a vertical direction, is designated 446. The intersection of the leading face 446 and the lower horizontal surface of the blade, designated 448, is chamfered or rounded at 450. The lower horizontal surface 448 is not necessarily coincident with the remaining lower surface of the blade because it is desired that the distance between the horizontal surfaces 440 and 448 be of a predetermined thickness, designated $s$. The vertical surface 442 and its corresponding surface 442' on the blade 410 cooperate to clamp and close the jaws of the fastener elements about the beaded edge of the tape when the clamping blades are in their fully closed position. The horizontal surfaces 440 and 440' provide aligned supporting means for receiving, arresting and positionally locating a fastener element which is delivered by the punch 212. The ledge thickness $s$ acts to space the fastener elements from each other on the tape. As shown in Fig. 24, the corners of the ledges 444 and 444' are cut out on the sides adjacent the severing die 268 to provide clearance for the projection 32 of the fastener elements, the cut-out corners being designated 452 and 452'.

The machine operates in the following manner. The tape T under suitable tension is fed through the machine continuously and passes downwardly through the tape slot 216 of the severing punch 212 and downwardly through the slot 272 of the severing die 268. Upon each revolution of the main shaft 62, the strip S is indexed over the described dies and beneath the punches for a predetermined distance so that the jaws of the endmost fastener element in the strip are astride the tape, whereupon the indenting, notching and fastener element severing punches, which are assembled in the holder 196 and reciprocated by the punch slide 106 by means of the eccentric 158 on the main shaft, begin to come down to act upon the upper face of the strip S, as shown in Fig. 16.

In the stage of operations illustrated in Figs. 18 and 19, the strip S is engaged by the punch 212, the pilot projection 214 entering a recess 30 formed by the indenting punch in a previous cycle. At this stage, the indenting and notching punches have not engaged the strip S, though all of the punches move together as a unit during their working strokes and in the same direction as the direction of movement of the tape. As previously explained, the operating faces of the punches have been initially fixed in a vertical plane in the relative positions illustrated by means of the adjusting pins 236 so that the punch 212 will have a comparatively long working stroke. It is desired that the fastener element severing punch shall travel a comparatively substantial distance below the plane of severance of a fastener element from the strip and to a clamping station located below said plane. The clamping blades 408 and 410 are in their fully retracted positions.

Figure 20:
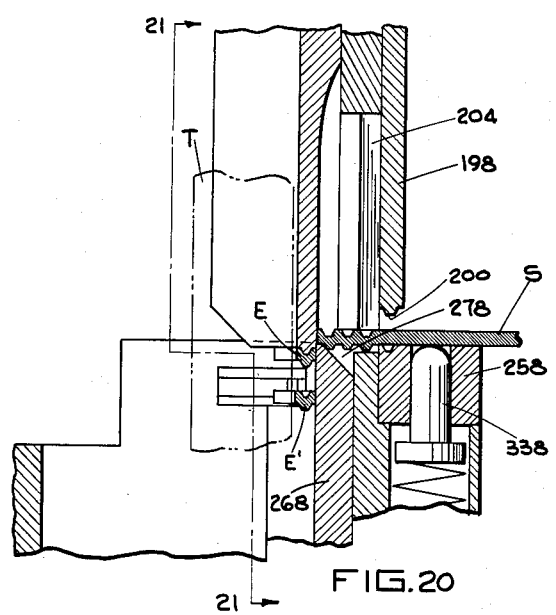
Figure 21:
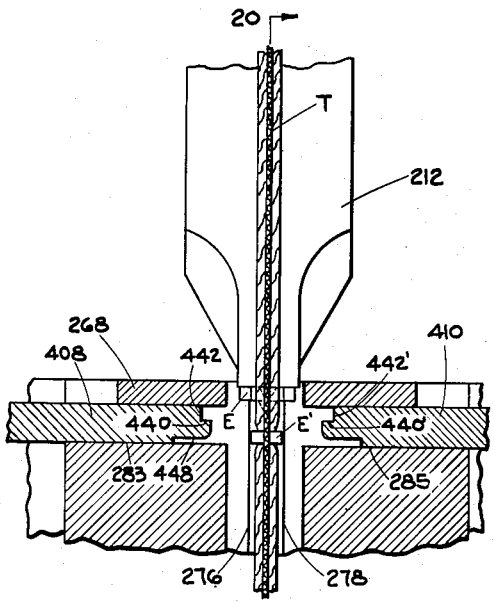

At an intermediate stage, shown in Figs. 20 and 21, the fastener element severing punch 212 has completely severed a fastener element E from the strip S and is in engagement with such severed element in its downward movement through the severing die 268. The fastener element severing punch 212 does not reach the end of its stroke upon severing a fastener element from the end of the strip but proceeds beyond the plane of severance, the top of the die 268, and downwardly through the die aperture 272. As the assembly of punches moves downwardly, they move in the same direction as the direction of movement of the tape T and at a greater speed than the speed of movement of the tape. The movement of the severing punch 212 has forced the strip S into engagement with the dies against the pressure exerted by the spring-urged pressure pin 338.

As shown in Fig. 17, a fastener element E has been severed from the strip along the line P" so that the head portion 38 of the fastener element abuts the wall 270 in its movement through the die aperture 272. The jaws of the fastener element are astride the beaded edge of the moving tape as the element moves down through the die aperture. In its movement, the fastener element E is confined on its upper surface by the operating face of the punch and the pilot 214 within the recess 30. The severed fastener element also has its position controlled in its movement through the die slot 272 by the pressure which is applied by the forward edges of the resiliently urged tape guide plates 286 and 288, which bear against the beaded edge of the tape within the jaws of the fastener element. The pressure exerted by the plates 286 and 288 on the beaded edge of the tape serves to resiliently press the head portion 38 against the contoured die wall 274 and the jaws 40 against the walls 280 and 282. The position controlling influence provided by the nonplanar surface walls 280, 282 and 274 of the die 268 in combination with the plates 286 and 288 is adequate to positively control the movement of a fastener element through the die; however, the cooperation of the pilot 214, having the elliptical horizontal cross-section, with the recess 30, having a similar cross-section, gives added positional control of the fastener element and further prevents the element from being pivoted in a horizontal plane. It thus will be apparent that the severed fastener element is prevented from twisting or turning in any direction and can only move in a vertical, downward direction through the die in the manner desired and under the most positively controlled conditions. At this stage, the indenting punch has as yet not engaged the face of the strip while the notching punches are about to perform their function of shearing the small pieces of scrap material 34 out of the strip to form the desired serrations. The clamping blades are closing in under the severed fastener element as it moves down through the die.

In the stage of operations shown in Figs. 22 and 23, and 26 to 28, the severing punch 212 is at the end of its stroke and has positively and accurately delivered and positionally located the severed fastener element onto the ledges 444 and 444' of the blades 408 and 410, respectively, which have been moved within the die aperture 272 as the blades are closing. The cut-outs 452 and 452' have permitted the fastener element projection 32 to bypass the ledges 446 and 446' so that the element's jaws 40 rest on the horizontally aligned supporting surfaces 440 and 440'. As the blades close, their vertical clamping surfaces 442 and 442' engage the flats 36 upon the jaws 40 of the fastener element so that the jaws will be uniformly bent or deformed from their divergent positions to the parallel closed positions. Since the position of the fastener element has been accurately and positively controlled in its movement from the plane of severance until positionally located upon the supporting surfaces 440 and 440' in the line of action of the clamping portions 442 and 442' of the blades, it will be apparent that the jaws when closed will uniformly and completely encircle the beaded edge of the tape. The tape has been moving continuously through the severing die aperture; however, at the very last moment or increment the motion of the tape is temporarily arrested as the jaws of the fastener element are finally and completely closed about the beaded edge of the tape. If desired, the leading faces 446 and 446' of the blades may be so located that these surfaces also serve to pinch the cords 50, or the beaded edge of the tape, to aid in temporarily arresting the continuously moving tape as the clamping blades complete their strokes.

At this stage of the operations, as also shown in Fig. 16, the indenting punch 198 has engaged the strip S so that the projection 208 presses the metal into the recess 260 on the indenting die to thereby form a recess 30 on the top surface of the strip and a corresponding projection 32 on the bottom side of the strip. The notching punches 202 and 204 have completed their strokes and have sheared the pieces 34 from the edges of the strip to form the desired serrations.

Figure 22:
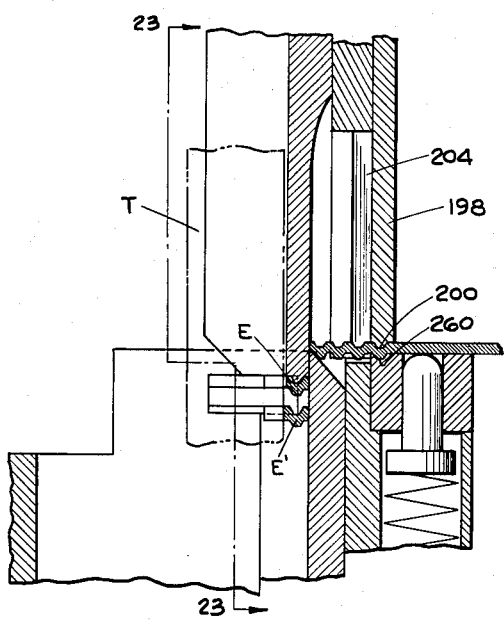
Figure 23:
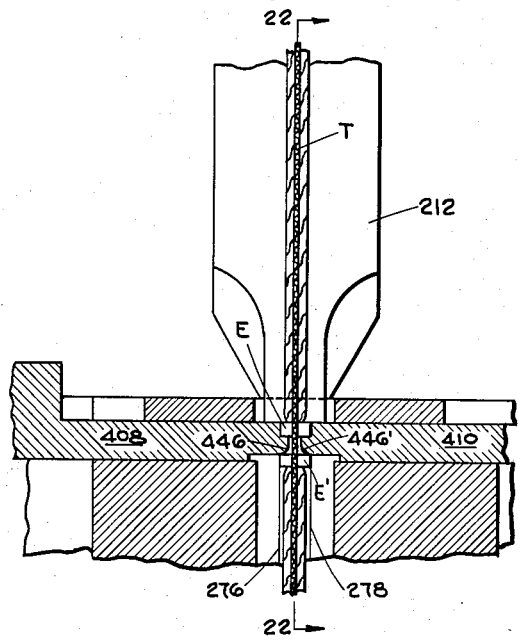

The description thus far is actually of one-half of a cycle, the remaining half of the cycle being illustrated by viewing Figs. 18, 20 and 22, and their corresponding cross-sections shown in Figs. 19, 21 and 23 in a reverse order.

Figs. 25 to 28 illustrate the spacing or pitch control function performed by the preferred construction of clamping blades. As shown in Fig. 26, the tape T is moving continuously in the direction of the arrow and unhindered. The clamping blades 408 and 410 have closed to the extent that the jaws 40 of a fastener element E have been delivered upon the horizontally aligned supporting surfaces 440 and 440'. The jaws 40 are in their fully divergent positions.

As shown in Fig. 27, the clamping blades 408 and 410 have moved together still further resulting in the vertical clamping surfaces 442 and 442' acting upon the element's jaws 40 to begin to close them. The chamfered or rounded corners 450 and 450' engage and slide over the corners of a fastener element E', which has been securely clamped onto the tape in a previous cycle, and the lower horizontal surfaces 448 and 448' begin to bear against the adjacent surfaces of the element E'. The ledges 444 and 444' having a selected thickness s cooperate with the element E', previously attached to the tape to accurately space therefrom the element E, which is being clamped onto the tape, by an amount corresponding to such ledge thickness s. The movement of the blades 408 and 410 is faster than the movement of the tape T, for the timing of the machine has been initially adjusted so that the tape feed means will move the tape continuously through the machine at a slightly slower rate than the rate of movement of the reciprocating punches and clamping blades.

When, as shown in Fig. 28, the clamping blades 408 and 410 have completed their closing movements, the jaws 40 of the element E are fully and completely closed. The element E has been spaced from the element E' by an amount equal to the thickness S of the ledges 444 and 444'. The clamped element E will now move with the tape when the tape moves. However, at this very last moment or increment of time, which is but a fraction of a second because the machine operates at 3,000 R. P. M. or more, the progress of the tape is temporarily arrested. During the very short time interval that the movement of the tape is arrested, the time interval required for the ledges 444 and 444' to pass through the forward half of the cycle, as shown in Figs. 26, 27 and 28, and the return half of the cycle, illustrated by viewing Figs. 26, 27 and 28 in reverse order, the scooped tape or stringer F is stretched between the clamping blades 408 and 410 and the tape feed drum 116. As shown in Fig. 25, this stretch is distributed over a comparatively long length of finished stringer, designated L, which in actual practice is approximately 24 inches. Thus, uniform and accurate spacing is obtained though the tape is being fed continuously through the machine. The slight amount of stretch imparted to the finished stringer in the procedure described above is so negligible as to be inconsequential in the finished product. The tape inherently possesses a greater amount of residual stretch than is imparted to it by the described operation.

When it is desired to change the scoop pitch of the fastener so that there will be another selected distance or spacing between fastener elements on the tape, clamping blades having a ledge thickness equal to such desired spacing are substituted for the clamping blades in the machine by simply securing such other blades to the blade holders 186 and 188.

While the preferred embodiment of the invention is described as a single-machine, it is within the scope of the invention to preliminarily form the strip in another machine or rolling mill. The strip may be preliminarily formed or rolled with or without serrations. If the strip is formed with the serrations in situ, as shown for example in the patent to Ulrich, 2,330,936, issued October 5, 1943, the notching punches, as well as the indenting punch, may be omitted. The use of a strip having the fastener elements shaped therein in embryo form serves to increase the life of the fastener element severing punch and die. The term "strip of fastener element material" as used in the claims, unless otherwise limited, refers to a flat strip which is otherwise undeformed, or a strip which has been deformed to provide a series of equally spaced projections on one side thereof and equally spaced recesses on the other side thereof, or a strip which has been formed with projections and recesses upon its faces and serrations along its lateral edges, with or without fins in such serrations, such serrations serving to partially form the jaws of the fastener elements.

While the preferred form of the invention contemplates clamping blades formed with means for positively and accurately controlling scoop pitch, it is within the scope of the invention to omit such pitch control means from the blades by thinning down the ledges 444 and 444' so that they do not have a thickness corresponding to the desired spacing between elements. When using clamping blades which will not provide the pitch control function, spacing between elements may be obtained by timing and coordinating the continuously rotating tape feed drum with the movement of the punches and clamping blades. The uni-directional movement of the tape and punches during their working strokes makes the operation possible. However, the provision of the added spacing means described affords more accurate scoop pitch control than obtainable without such means.

It is also within the scope of the invention to provide separate means for spacing the fastener elements on the tape, instead of the means integral with the clamping blades specifically described.

While the preferred form of the invention has been described as including means for moving the tape continuously through the machine, it is within the scope of the invention to feed the tape intermittently rather than continuously. While not as satisfactory as continuous tape feed, this can be accomplished by intermittently indexing the movement of the tape drum by a suitable mechanism, such as a ratchet wheel and pawl, instead of the direct continuous drive off the main shaft, as described.

It will be apparent that the described machine affords simple and easy access to the punches and dies for regrinding or sharpening when necessary. Also, the machine affords very simple means for adjusting the timing with respect to each other of the tape feed means, strip feed means, indenting means, notching means, punching means and clamping means.

The described machine produces superior slide fasteners at speeds hitherto unrealized in the art. Interposed transfer mechanisms are eliminated. Spring pads and the inertia of spring returns which limit ultra-high speed operation are practically eliminated. All reciprocating instrumentalities are actuated directly from a single main shaft by simple harmonic motions. The strip from which the fastener elements are formed is fed by a simple indexing means actuated by the movement imparted to the punches themselves. The tape preferably is fed by a simple, continuous drive mechanism off the main shaft.

It will be understood that while we have described our invention in a preferred form, changes may be made in the apparatus disclosed without departing from the spirit of the invention as sought to be defined in the following claims.

We claim:

1. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element at said station, clamping means movable to said station for clamping the severed fastener elements successively onto the tape in spaced relation, the wall of the die aperture serving to control the position of a fastener element as it is being delivered to said station, and means for moving said support means and clamping means.

2. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element at said station, clamping means movable to said station for clamping the severed fastener elements successively onto the tape in spaced relation, the wall of the die aperture serving to control the position of a fastener element as it is being delivered to said station, the direction of movement of the tape being the same as the direction of movement of the punch as said punch delivers fastener elements to said station, and means for moving said support means and clamping means.

3. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element of said station, clamping means movable to said station for clamping the severed fastener elements successively onto the tape in spaced relation, the wall of the die aperture serving to control the position of a fastener element as it is being delivered to said station, the direction of movement of the tape being the same as the direction of movement of the punch as said punch delivers fastener elements to said station, means at said station cooperating with a fastener element previously clamped onto the tape for spacing therefrom an element being clamped onto the tape, and means for moving said support means and clamping means.

4. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element at said station, clamping means movable to said station for clamping the several fastener elements successively onto the tape in spaced relation, tape guide means extending within the die aperture and bearing against the beaded edge of the tape with resilient pressure, the wall of the die aperture and said tape guide means cooperating to control the position of a fastener element as it is being delivered to said station, and means for moving said support means and clamping means.

5. The apparatus for manufacturing slide fastener stringers of claim 4 in which the means for feeding the tape feeds said tape continuously, said apparatus further including means at the stated station cooperating with a fastener element previously clamped onto the tape for spacing therefrom an element being clamped onto the tape.

6. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for feeding a tape, means for feeding a continuous strip of fastener element material in a direction perpendicular to the tape, said strip being formed with predeterminedly spaced recesses on its top face and projections on its bottom face, a severing die, a severing punch actuated to cooperate with said die to successively and completely sever fastener elements from the end of the strip as said strip is fed over the die, said punch being provided with a pilot projection adapted to enter a recess on the strip as a fastener element is being severed from the strip, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element at said station, clamping means movable to said station for clamping the severed fastener elements successively onto the tape in spaced relation, the pilot projection on the punch within the recess of a severed fastener element and the wall of the die aperture cooperating to control the position of a fastener element as it is being delivered to said station, and means for moving said support means and clamping means.

7. The apparatus for manufacturing slide fastener stringers of claim 6 in which the means for feeding the tape feeds the tape continuously, said apparatus further including means at the stated station cooperating with a fastener element previously clamped onto the tape for spacing therefrom an element being clamped onto the tape.

8. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for feeding a tape, means for feeding a continuous strip of fastener element material in a direction perpendicular to the tape, said strip being formed with predeterminedly spaced recesses on its top face and projections on its bottom face, a severing die, a severing punch actuated to cooperate with said die to successively and completely sever fastener elements from the end of the strip as said strip is fed over the die, said punch being provided with a pilot projection adapted to enter a recess on the strip as a fastener element is being severed from the strip, said die being provided with an aperture therethrough having a wall which corresponds in contour with the contour of a fastener element head portion, said aperture permitting the tape, the punch and a fastener element to pass therethrough with the punch delivering a fastener element to a station directly below the die, the edge of said tape passing through said station so that the jaws of the fastener element are astride the edge of the tape when the punch delivers a severed fastener element to said station, support means movable to said station below the die for receiving, arresting and positionally locating the severed fastener element at said station, clamping means movable to said station for clamping the severed fastener elements successively onto the tape in spaced relation, tape guide means extending within the die aperture and bearing against the beaded edge of the tape with resilient pressure, the pilot projection on the punch within the recess of a severed fastener element, the wall of the die aperture and said tape guide means cooperating to control the position of a fastener element as it is being delivered to said station, and means for moving said support means and clamping means.

9. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough to a station directly below the die, a pair of clamping blades located to reciprocate in a plane below the plane in which the fastener elements are severed from the strip, said blades each being formed at its working end with a ledge, said ledges providing horizontally aligned supporting surfaces for receiving, arresting and positionally locating the completely severed fastener elements as they are individually and directly delivered by the punch passing through the die aperture, the edge of said tape passing between said clamping blades after passing through the die aperture so that the jaws of the fastener elements are astride the edge of the tape when the punch delivers the severed fastener elements to said aligned supporting surfaces, and said ledges providing vertically disposed surfaces for clamping the jaws of the fastener elements about the beaded edge of the tape at said station below the die, and means for reciprocating the clamping blades toward and away from each other.

10. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough to a station directly below the die, a pair of clamping blades located to reciprocate in a plane below the plane in which the fastener elements are severed from the strip, said blades each being formed at its working end with a ledge, said ledges providing horizontally aligned supporting surfaces for receiving arresting and positionally locating the completely severed fastener elements as they are individually and directly delivered by the punch passing through the die aperture, the edge of said tape passing between said clamping blades after passing through the die aperture so that the jaws of the fastener elements are astride the edge of the tape when the punch delivers the severed fastener elements to said aligned supporting surfaces, and said ledges providing vertically disposed surfaces for clamping the jaws of the fastener elements about the beaded edge of the tape at said station below the die, said ledges cooperating with a fastener element previously clamped onto the tape to space therefrom an element being clamped onto the tape by an amount corresponding to the ledge thickness, the direction of movement of the tape being the same as the direction of movement of the punch as said punch delivers fastener elements to said aligned supporting surfaces and means for reciprocating the clamping blades toward and away from each other.

11. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, a severing die, a severing punch actuated to cooperate with said die to successively and completely sever fastener elements from the end of the strip as said strip is fed over the die, said die being provided with an aperture therethrough having a wall which corresponds in contour with the contour of a fastener element head portion, said aperture permitting the tape, the punch and a fastener element to pass therethrough to a station directly below the die, tape guide means extending within the die aperture and bearing against the beaded edge of the tape with resilient pressure, a pair of clamping blades located to reciprocate in a plane below the plane in which the fastener elements are severed from the strip, said blades each being formed at its working end with a ledge, said ledges providing horizontally aligned supporting surfaces for receiving the completely severed fastener elements as they are individually and directly delivered by the punch passing through the die aperture, the edge of said tape passing between said clamping blades after passing through the die aperture so that the jaws of the fastener elements are astride the edge of the tape when the punch delivers the severed fastener elements to said aligned supporting surfaces, and said ledges providing vertically disposed surfaces for clamping the jaws of the fastener elements about the beaded edge of the tape at said station below the die, said ledges cooperating with a fastener element previously clamped onto the tape to space therefrom an element being clamped onto the tape by an amount corresponding to the ledge thickness, the wall of the die aperture and said tape guide means cooperating to control the position of a fastener element as it is being delivered to the said aligned supporting surfaces, the direction of movement of the tape being the same as the direction of movement of the punch as said punch delivers fastener elements to said aligned supporting surfaces and means for reciprocating the clamping blades toward and away from each other.

12. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, said strip being formed with predeterminedly spaced recesses on its top face and projections on its bottom face, a severing die, a severing punch actuated to cooperate with said die to successively and completely sever fastener elements from the end of the strip as said strip is fed over the die, said punch being provided with a pilot projection adapted to enter a recess on the strip as a fastener element is being severed from the strip, said die being provided with an aperture therethrough having a wall which corresponds in contour with the contour of a fastener element head portion, said aperture permitting the tape, the punch and a fastener element to pass therethrough to a station directly below the die, a pair of clamping blades located to reciprocate in a plane below the plane in which the fastener elements are severed from the strip, said blades each being formed at its working end with a ledge, said ledges providing horizontally aligned supporting surfaces for receiving the completely severed fastener elements as they are individually and directly delivered by the punch passing through the die aperture, the edge of said tape passing between said clamping blades after passing through the die aperture so that the jaws of the fastener elements are astride the edge of the tape when the punch delivers the severed fastener elements to said aligned supporting surfaces, and said ledges providing vertically disposed surfaces for clamping the jaws of the fastener elements about the beaded edge of the tape at said station below the die, said ledges cooperating with a fastener element previously clamped onto the tape to space therefrom an element being clamped onto the tape by an amount corresponding to the ledge thickness, the pilot projection on the punch within the recess of a severed fastener element and the wall of the die aperture cooperating to control the position of a fastener element as it is being delivered to said aligned supporting surfaces, the direction of movement of the tape being the same as the direction of movement of the punch as said punch delivers fastener elements to said aligned supporting surfaces and means for reciprocating the clamping blades toward and away from each other.

13. Apparatus for manufacturing slide fastener stringers comprising a series of fastener elements clamped onto the beaded edge of a tape in spaced relation, said fastener elements each having a head portion formed with a recess on one side and a projection on the other side and a pair of jaws clamped about the beaded edge of the tape, said apparatus comprising means for continuously feeding a tape, means for feeding a continuous strip of fastener element material in a direction perpendicular to the tape, said strip being formed with predeterminedly spaced recesses on its top face and projections on its bottom face, a severing die, a severing punch actuated to cooperate with said die to successively and completely sever fastener elements from the end of the strip as said strip is fed over the die, said punch being provided with a pilot projection adapted to enter a recess on the strip as a fastener element is being severed from the strip, said die being provided with an aperture therethrough having a wall which corresponds in contour with the contour of a fastener element head portion, said aperture permitting the tape, the punch and a fastener element to pass therethrough to a station directly below the die, tape guide means extending within the die aperture and bearing against the beaded edge of the tape, a pair of clamping blades located to reciprocate in a plane below the plane in which the fastener elements are severed from the strip, said blades each being formed at its working end with a ledge, said ledges providing horizontally aligned supporting surfaces for receiving the completely severed fastener elements as they are individually and directly delivered by the punch passing through the die aperture, the edge of said tape passing between said clamping blades after passing through the die aperture so that the jaws of the fastener elements astride the edge of the tape when the punch delivers the severed fastener elements to said aligned supporting surfaces, and said ledges providing vertically disposed surfaces for clamping the jaws of the fastener elements about the beaded edge of the tape at said station below the die, said ledges cooperating with a fastener element previously clamped onto the tape to space therefrom an element being clamped onto the tape by an amount corresponding to the ledge thickness, the pilot projection on the punch within the recess of a severed fastener element, the wall of the die aperture and the tape guide means cooperating to control the position of a fastener element as it is being delivered to said aligned supporting surfaces, the direction of movement of the tape being the same as the direction of movement of the punch as said punch delivers fastener elements to said aligned supporting surfaces and means for reciprocating the clamping blades toward and away from each other.

References Cited in the file of this patent

UNITED STATES PATENTS

| | | |
|---|---|---|
| 1,947,956 | Sundback | Feb. 20, 1934 |
| 1,976,929 | Elliott | Oct. 16, 1934 |
| 2,125,707 | Anderson et al. | Aug. 2, 1938 |
| 2,144,638 | Reiter | Jan. 24, 1939 |
| 2,144,673 | Reiter | Jan. 24, 1939 |
| 2,148,673 | Arentzen | Feb. 28, 1939 |
| 2,245,031 | Gottlieb | June 10, 1941 |
| 2,261,552 | Koppel | Nov. 4, 1941 |
| 2,286,885 | Wiley | June 16, 1942 |
| 2,321,951 | Susskind | June 15, 1943 |
| 2,336,662 | Wintriss | Dec. 14, 1943 |
| 2,359,140 | Meitner | Sept. 26, 1944 |
| 2,370,380 | Ulrich | Feb. 27, 1945 |
| 2,396,933 | Voity | Mar. 19, 1946 |
| 2,418,761 | Dasher | Apr. 8, 1947 |
| 2,437,793 | Silberman | Mar. 16, 1948 |
| 2,444,706 | Loew | July 6, 1948 |
| 2,468,643 | Soave | Apr. 26, 1949 |
| 2,473,623 | Voity | June 21, 1949 |
| 2,639,755 | Lange | May 26, 1953 |